Patented Aug. 6, 1929.

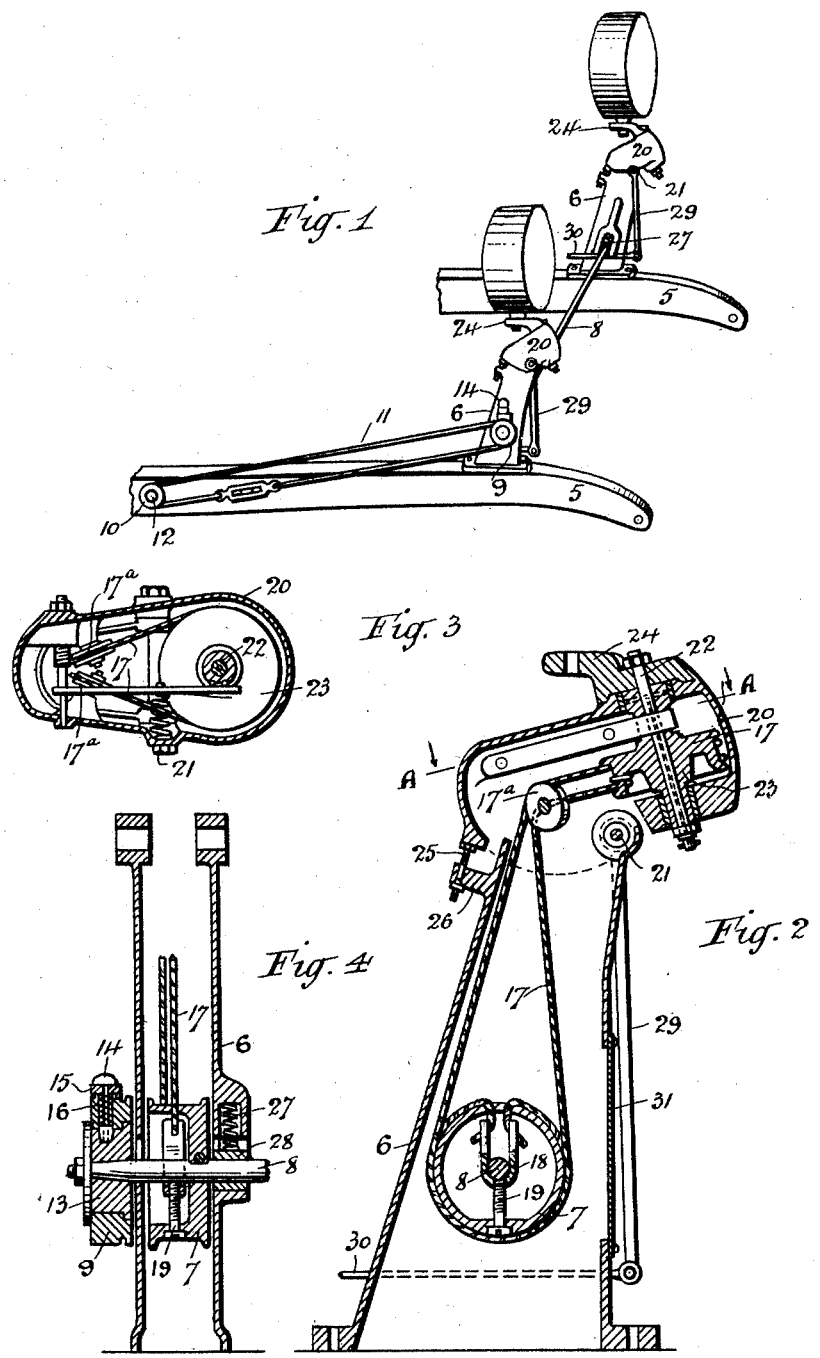

1,723,850

UNITED STATES PATENT OFFICE.

JAMES HYNDES GILLIES, OF HOBART, TASMANIA, AUSTRALIA.

HEADLIGHTS OF VEHICLES.

Application filed October 6, 1926, Serial No. 139,940, and in Australia July 8, 1926.

This invention relates to vehicle headlights and more particularly to the construction, mounting and operation of the type of headlights known as dirigible and which lights are controlled by the steering mechanism of a motor vehicle, or independently by the driver.

The present invention has for its object to provide a mounting for vehicle headlights in which mechanism is conveniently housed and operated, preferably from the steering wheel gearing, whereby the lamps will be turned simultaneously with a turning movement of the wheels of the vehicle and during such turning movement will be dipped automatically.

A further object of the invention is the provision of, manually operable, means for adjusting the lights to permit of the same being turned to direct their rays rearwardly.

Another object of the invention is to provide for such automatic adjustment of the headlights as will prevent their rays being projected in a manner to inconvenience the drivers of oncoming automobiles, and with this in view, the headlights are mounted vertically in position out of line with the longitudinal axes of rotatable spindles which are backwardly inclined from the vertical, the headlights being thus supported upon the vehicle chassis and the spindles being turned to synchronize with the movements of the steering mechanism of the vehicle so that when the vehicle is steered toward either side of a roadway, the headlights will be tilted so as to direct their rays onto the road surface, at said side thereof.

Preferably, the headlights are secured upon horizontal platforms each of which is mounted upon a backwardly inclining spindle in a housing that also inclines with the spindle, each housing being pivotally mounted upon a hollow standard secured to the chassis of the vehicle.

Means are provided for rotating the spindle and headlight platform upon which a lamp is mounted at a point out of line with the longitudinal axis of the spindle for canting the housing forwardly, and for returning it to its normal position after so canting.

In the accompanying drawings:—

Fig. 1 is a perspective view illustrating the device of the invention installed on a part of a motor vehicle.

Fig. 2 is a vertical, front to rear, sectional view illustrating the standard, housing and headlight platform with the spindle driving means.

Fig. 3 is a sectional view on the line A—A of Fig. 2 and

Fig. 4 shows the lower part of the fitting in end sectional elevation.

Upon the vehicle chassis 5 the hollow standards 6 are bolted. In the lower part of each standard is a pulley 7 on a spindle 8 that passes across from one standard to the other. Also mounted on the spindle 8 outside the standard is a pulley 9 over which a wire cable 11 is passed from a pulley 10 on the worm wheel spindle 12 of the steering gear, not shown in the drawing. The pulley 9 is mounted upon a bushing 13 permanently secured upon the spindle 8, which for the purpose may be tapered, but which is free to turn on the bushing when desired. To secure the pulley to the bushing I employ a stud 14 that passes through a cap 15 and a hole in the pulley 9 and into a recess in the bushing 13. A compression spring 16 is arranged between the cap and the bushing and when the pulley is required to run free on the bushing the stud is withdrawn against the spring 16 and the pulley turned to bring the recess in the bushing out of alinement with the stud which is then released to rest at its inner end against the periphery of the bushing. Normally however, the stud is in engagement with the bushing to lock the pulley to the spindle 8 that is rotated from the steering wheel mechanism. The head of the stud 14 may be provided with means whereby when it is raised and rotated the stud will be held out of engagement with the bushing. The lower end of the stud should be tapered.

Within each standard, on the spindle 8 is a driving pulley 7 which is recessed to be partly hollow and on which the headlight platform driving cord 17 is mounted. The cord is first threaded through two relatively adjacent holes formed in the bobbin 23 and then in opposite directions around the bobbin and rearwardly and over idler pulleys 17ª. The free ends of the cord are then respectively passed around and through openings in the pulley 7 and into a U-shaped yoke 18 into which the end of set screw 19 is threaded.

If this screw be turned in the yoke 18 the latter will be drawn onto the set screw to take up slack in the cord 17.

Pivotally mounted at 21 on the forward part of the standard is the housing 20 which houses the headlight bracket spindle 22. This spindle together with the housing is inclined rearwardly from the vertical and houses a bobbin 23 over which the cord 17 passes. The lower end of the spindle is journalled in the housing and on its upper end is mounted, the headlight base 24. To the approximately horizontal surface of the base a headlight is bolted at a point offset with respect to the axis of the spindle 22. The lower surface of the base may seat on the inclining top of the housing 20 and turns thereon with the spindle, or the base may be secured directly to the spindle to turn therewith. The spindle is bored longitudinally to provide for a grease way to the bearings for the spindle.

The rear of the housing seats on an adjustable set screw 25 in a bracket 26 on the standard 6 and by means of which the direction of focus of the lamps may be varied in a vertical plane. With this arrangement of parts it will be readily seen that when the car is in motion the housing will tend to chatter upon the screw 25 unless it be held thereon. This is avoided by applying a downward pressure upon the transverse spindle 8, and for this purpose the inner side of each standard is provided with a housing for a compression spring 27 that seats on a sleeve 28 on the spindle 8. Secured to each pivotal member 21 is a downwardly extending rod 29 to the lower end of which another rod or connecting member 30 is connected and which rod passes to a point in the vehicle near the driver whereby he can manually operate it to cant the whole housing forwards for the purpose of forwardly tilting the lamps. When the forward tilting movement occurs the floating spindle 8 is raised and the springs 27 are compressed, the reaction of which will cause the housings to assume their normal positions or seats upon the set screws 25. The springs 27 are kept under tension and normally serve to keep the spindle 8 in lowered position and the cord 17 taut. Any additional slackness in the cord can be taken up, as previously explained, by the set screw 19. To enable the spindle to be raised the sides of the standards are slotted as shown in Fig. 4.

In operation, the headlights may be directly and manually tilted in the manner explained through the member 30, but this will only be necessary when approaching a car in a direct line ahead. If in approaching an oncoming car, it becomes necessary to turn to one side to leave a clear road for the other vehicle the driver's actuation of the steering mechanism through turning of the steering wheel will be communicated through the steering wheel gear and the spindle 12 to the spindles 8 and 22. When the latter spindles turn, the headlights will turn with them and as the headlights are mounted in offset relation to the spindles and as, moreover, the platforms seat on inclined bases on the housings, the result of the turning of the bases and headlights will be to direct the rays from the headlights downwardly and laterally onto the roadway at the side toward which the turn is made. The headlights are retained in this position until the steering wheel is straightened and the headlights then resume their normal positions. This automatic adjustment is made possible by the permanent backward inclination of the spindle 22 which ensures that when the headlight bases are turned about the axes of the spindles the headlights will move on an arc along an ascending path. When the vehicle is again steered in a straight line direction then the reverse will occur and the headlights will resume their normal positions. This normal dipping of the headlights and the removal of glare therefrom upon an approaching car will be of special use when cars meet upon a sharp curve. In such a case, the lights of both cars, if each is equipped with this invention, will be tilted and thus avoid inconvenience to the drivers of both cars, while at the same time the driver of each car will have his side of the road clearly lighted and defined.

The spindle 22 or its sleeve is provided with a flat surface within the housing as shown in Fig. 3 and against this a plate is pressed by a spring as described in my pending U. S. application Ser. No. 88,680. When the spindle is rotated the flat surface leaves the plate but returns thereto when the headlights are brought back to the normal again. By the pressure of the plate on the spindle the same is stabilized and chattering of the parts while the vehicle is in motion is avoided.

An opening is provided in each standard and closed by a plate 31 which, when removed, gives access to the pulley 7.

A convenient inclination for the spindles 22 is about 15 to 17 degrees backwards from the vertical and with this inclination and the headlights positioned vertically at points out of line with the longitudinal axes of the spindles, a satisfactory dipping of the headlight rays will be effected with a turn of the car from a straight course of about ten degrees or less.

In daylight when the movement of the lamp is not necessary, the driving pulley may be rendered inactive by adjusting the pin or stud 14, as previously explained. When the clutch is in this position the headlights may be turned through an arc of 180° or to a position where, if lighted, they would light the rear of the car.

Having now described my invention what I claim as new and desire to secure by Letters Patent is:—

1. In vehicle headlights for vehicles having steering mechanism, a rotatable spindle mounted in upwardly and backwardly inclined relation to the front of the vehicle, a bracket upon said spindle embodying a portion offset from the axis of said spindle and having a lamp supporting upper side in a plane such as to be horizontal when the bracket is rotated to position with the lamp facing forwardly, a lamp carried by the offset portion of said bracket, and means responsive to operation of the steering mechanism of the vehicle for rotating the spindle to direct the lamp and cause it to move in an orbit inclined with respect to a horizontal plane whereby, when the steering mechanism is adjusted to steer the vehicle to either side, the rays from the lamp will be directed downwardly from the horizontal.

2. In vehicle headlights for vehicles embodying steering mechanism, a standard, a housing mounted upon said standard for rocking movement in a vertical direction, means adjustable to effect adjustment of the housing whereby to effect a corresponding adjustment of a headlight upon the standard of said housing, a rotatable spindle carried by said housing and inclined upwardly and rearwardly relative to the front of the vehicle, a bracket mounted on said standard and having a headlight supporting portion offset from the axis of said spindle, the offset portion having a lamp supporting upper side in a plane to be horizontal when the bracket is rotated to position with the headlight facing forwardly, and means responsive to movement of the steering mechanism of the vehicle for rotating the spindle to direct the headlight and cause it to travel in an orbit inclined with respect to a horizontal plane, and whereby, when the steering mechanism is adjusted to steer the vehicle to either side, the rays from the lamp will be directed downwardly from the horizontal.

3. In vehicle headlights, a spindle having its upper end backwardly inclining from the vertical relative to the longitudinal direction of movement of the vehicle, a standard, a housing upon said standard for supporting said spindle, said standard, housing, and spindle being duplicated on opposite sides of the chassis, a transverse spindle between the standards, a pulley on the transverse spindle adapted to be rotated from the steering gear mechanism, a local driving pulley on said transverse spindle within each standard, a bobbin on each inclined spindle, means for transmitting motion from each local driving pulley to the adjacent bobbin and a platform fixed perpendicular to each inclining spindle and a headlight mounted on said platform out of line with the axis of said spindle.

4. In vehicle headlights, a spindle having its upper end backwardly inclining from the vertical relative to the longitudinal direction of movement of the vehicle, a hollow standard at each side of the vehicle chassis, a housing in which said spindle is mounted pivotally connected to a standard and adapted to be rocked thereon manually, a transverse spindle between the standards adapted to float therein, a local driving pulley on the transverse spindle in each standard, a bobbin on each inclining spindle driven from the adjacent driving pulley, a headlight platform fixed perpendicular to each inclining spindle and tension springs in the standards bearing downwardly on the floating spindle.

5. In vehicle headlights, a spindle having its upper end backwardly inclining from the vertical relative to the longitudinal direction of movement of the vehicle, a hollow standard at each side of the vehicle chassis, a housing in which said spindle is mounted pivotally connected to a standard and adapted to be rocked thereon manually, a transverse spindle between the standards adapted to float therein, a local driving pulley on the transverse spindle in each standard, a bobbin on each inclining spindle driven from the adjacent driving pulley, a headlight platform fixed perpendicular to each inclining spindle, tension springs in the standards bearing downwardly on the floating spindle and means for cutting out the drive from the steering wheel mechanism to the floating spindle.

6. In vehicle headlights, a standard at each side of a vehicle chassis, a housing supporting a headlight and pivotally supported on each standard, a lug on each standard, a set screw in the lug impinging against the tail of the housing, a rotatable spindle in each housing secured to a headlight, a floating spindle between the standards, means on the spindle for rotating the headlight spindles, means for tilting each housing and tension springs in the standards bearing downwardly on the floating spindle.

7. In vehicle headlights, a rotatable spindle having its upper end backwardly inclining from the vertical relative to the longitudinal direction of movement of the vehicle, a standard upon the vehicle chassis, a housing upon said standard for supporting said spindle, said standard, housing, and spindle, being duplicated on opposite sides of the chassis, a transverse spindle between the standards adapted to float therein, a local driving pulley on the spindle in each standard, a bobbin on each inclining spindle driven from the adjacent pulley, a headlight platform secured perpendicular to each inclining spindle, and tension springs in the standards bearing downwardly upon the floating spindle.

In testimony whereof I have signed my name to this specification.

JAMES HYNDES GILLIES.